United States Patent
Centonza et al.

(10) Patent No.: US 11,601,844 B2
(45) Date of Patent: Mar. 7, 2023

(54) MANAGING OVERLOAD IN AT LEAST ONE CORE NETWORK

(71) Applicant: TELEFONAKTIEBOLAGET LM ERICSSON (PUBL), Stockholm (SE)

(72) Inventors: Angelo Centonza, Stockholm (SE); Lars-Bertil Olsson, Angered (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 136 days.

(21) Appl. No.: 17/114,893

(22) Filed: Dec. 8, 2020

(65) Prior Publication Data
US 2021/0092635 A1 Mar. 25, 2021

Related U.S. Application Data

(63) Continuation of application No. 15/513,888, filed as application No. PCT/SE2015/051004 on Sep. 25, 2015, now Pat. No. 10,897,723.

(Continued)

(51) Int. Cl.
*H04W 28/02* (2009.01)
*H04W 48/06* (2009.01)
(Continued)

(52) U.S. Cl.
CPC ....... *H04W 28/0289* (2013.01); *H04W 48/06* (2013.01); *H04W 76/10* (2018.02); *H04W 76/18* (2018.02)

(58) Field of Classification Search
CPC . H04W 28/0289; H04W 48/06; H04W 76/10; H04W 76/18
See application file for complete search history.

(56) References Cited

U.S. PATENT DOCUMENTS

| | | |
|---|---|---|
| 2013/0267229 A1 | 10/2013 | Gopalakrishnan |
| 2013/0322239 A1 | 12/2013 | Zhi et al. |

(Continued)

FOREIGN PATENT DOCUMENTS

| | | | | |
|---|---|---|---|---|
| EP | 2254367 A1 * | 11/2010 | ......... | H04W 36/385 |
| EP | 2477427 A1 * | 7/2012 | ......... | H04L 12/1446 |

(Continued)

OTHER PUBLICATIONS

English Translation of WO 2009/009940 A1, 2009, Retreived from PE2E Search on Jun. 16, 2022. (Year: 2009).*

(Continued)

*Primary Examiner* — Omar J Ghowrwal

(57) ABSTRACT

A shared Radio Network Node, RNN, and a method for managing overload in a core network. The shared RNN is configured to serve a wireless device, and the wireless device and the RNN are operating in a wireless communications network connected to the core network. The RNN receives a connection request from the wireless device, wherein the connection request comprises a mapping parameter configured to map to an MME connected to the RNN. Further, the MME is logically partitioned into several MMEs and configured to support multiple MME Codes, MMECs, each of which MMECs is pointing at a sharing operator. The mapping parameter comprises an MMEC configured to map to one MMEC supported by the MME. Further, the RNN rejects or redirects the connection request when the MMEC configured to map to one MMEC supported by the MME is associated with an overload action.

24 Claims, 6 Drawing Sheets

Related U.S. Application Data

(60) Provisional application No. 62/055,676, filed on Sep. 26, 2014.

(51) Int. Cl.
*H04W 76/10* (2018.01)
*H04W 76/18* (2018.01)

(56) References Cited

U.S. PATENT DOCUMENTS

| | | | |
|---|---|---|---|
| 2013/0324141 A1* | 12/2013 | Jung | H04W 72/04 455/450 |
| 2014/0022996 A1 | 1/2014 | Punz | |
| 2014/0148165 A1 | 5/2014 | Serravalle et al. | |
| 2014/0357258 A1* | 12/2014 | Smith | H04L 43/062 455/450 |
| 2017/0303186 A1 | 10/2017 | Centonza et al. | |

FOREIGN PATENT DOCUMENTS

| | | | | |
|---|---|---|---|---|
| EP | 2382816 | | 12/2012 | |
| EP | 2667665 | A1 | 10/2018 | |
| WO | WO-2009009940 | A1 * | 1/2009 | ............ H04W 60/00 |
| WO | 2010080056 | A1 | 7/2010 | |
| WO | 2012160977 | A1 | 11/2012 | |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.

3GPP, "3rd Generation Partnership Project; Technical Specification Group Radio Access Network; Evolved Universal Terrestrial Radio Access Network (E-UTRAN); S1 Application Protocol (S1 AP) (Release 12)", 3GPP TS 36.413 V12.1.0, Mar. 2014, 1-285.

Bing .com powered by Oxford Dictionaries. Comprise, Nov. 9, 2018, Retrieved from Internet: <URL: https://www.bing.com/search?q=def%3A+comprising&form=IE NTHT &mkt=en-us&httpsmsn=1&refig=ee801f0a24cf44e4b6e12d2280b38539&sp=1&pq=def%3A+comprising&sc=1-15&qs=n&sk=&cvid=ee801f0a24cf44e4b6e 12d2280b38539> (Year: 2018).

Unknown, Author, "CN overload in RAN sharing deployments", 3GPP TSG RAN WG3 Meeting #87bis, R3-150588, Tenerife—Santa Cruz, Spain, Alcatel-Lucent, Apr. 20-24, 2015, 1-4.

Unknown, Author, "Consideration on Per PLMN Overload Rejection", 3GPP TSG RAN WG3 Meeting #87, R3-150035, Athens, Greece, Huawei, Feb. 9-13, 2015, 1-3.

Unknown, Author, "Delay Tolerant Scheme for Extending Wait-timer", 3GPP TSG RAN WG2 #72bis, R2-110104, Dublin, Ireland, Jan. 17-21, 2010, 1-7.

Unknown, Author, "Discussion on the solutions for overload procedure", LG Electronics Inc., 3GPP TSG-RAN WG3 Meeting #84, R3-141226, Seoul, Korea, May 19-23, 2014, 1-5.

Unknown, Author, "RAN Sharing enhancements", 3GPP TSG-RAN WG3 #73, R3-111992, Athens, Greece, Aug. 22-26, 2011, 1-5.

Unknown, Author, "RRC Reject Overload Actions in RAN Sharing", 3GPP TSG RAN3 Meeting #86, R3-142911, San Francisco, CA, Ericsson, Nov. 17-21, 2014, 1-4.

\* cited by examiner

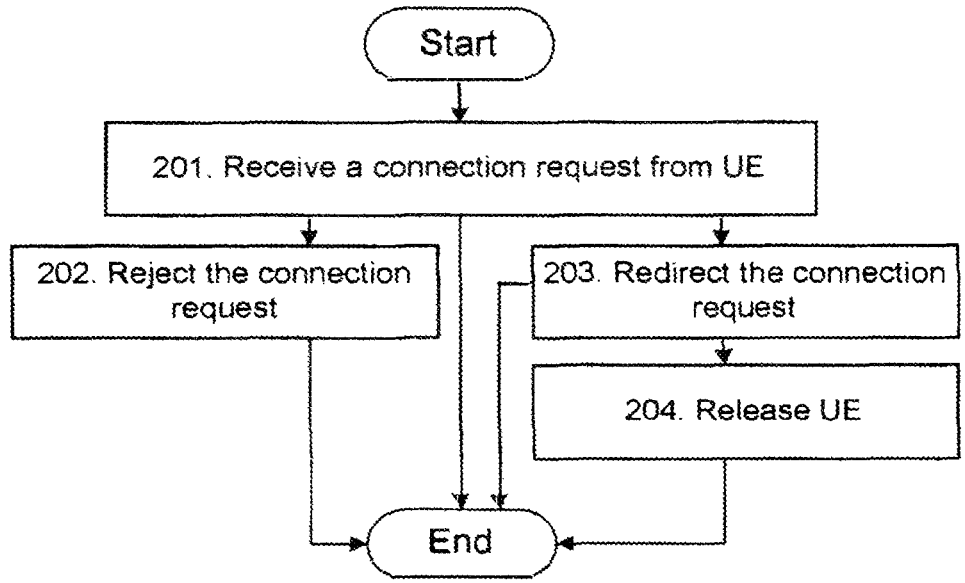
Fig. 2 Method in shared RNN 102
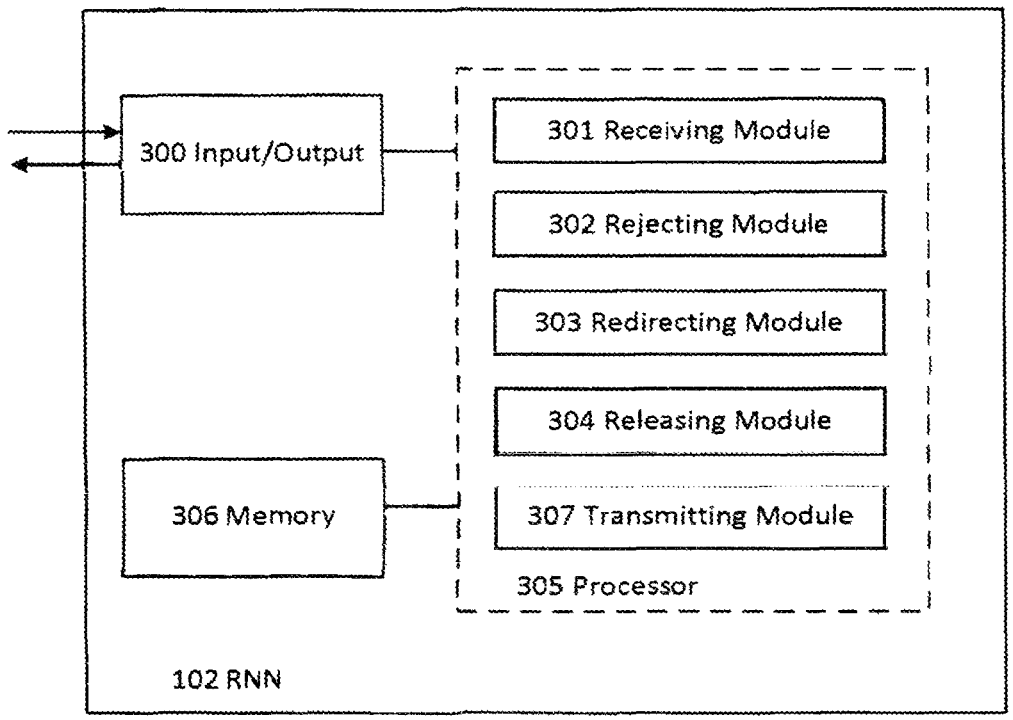
Fig. 3

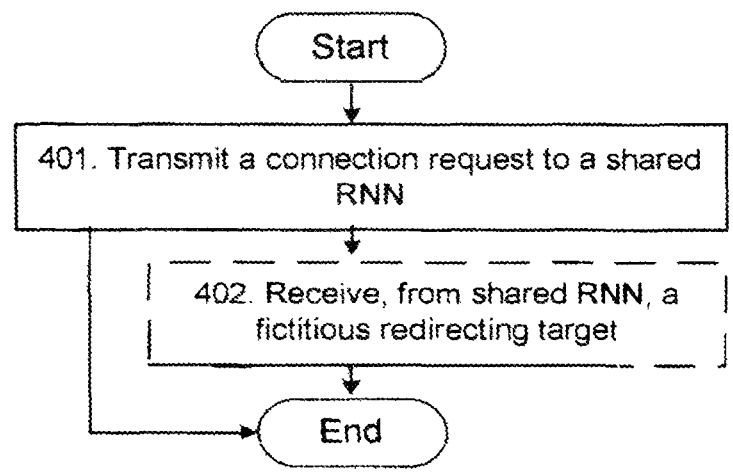
Fig. 4 Method in wireless device
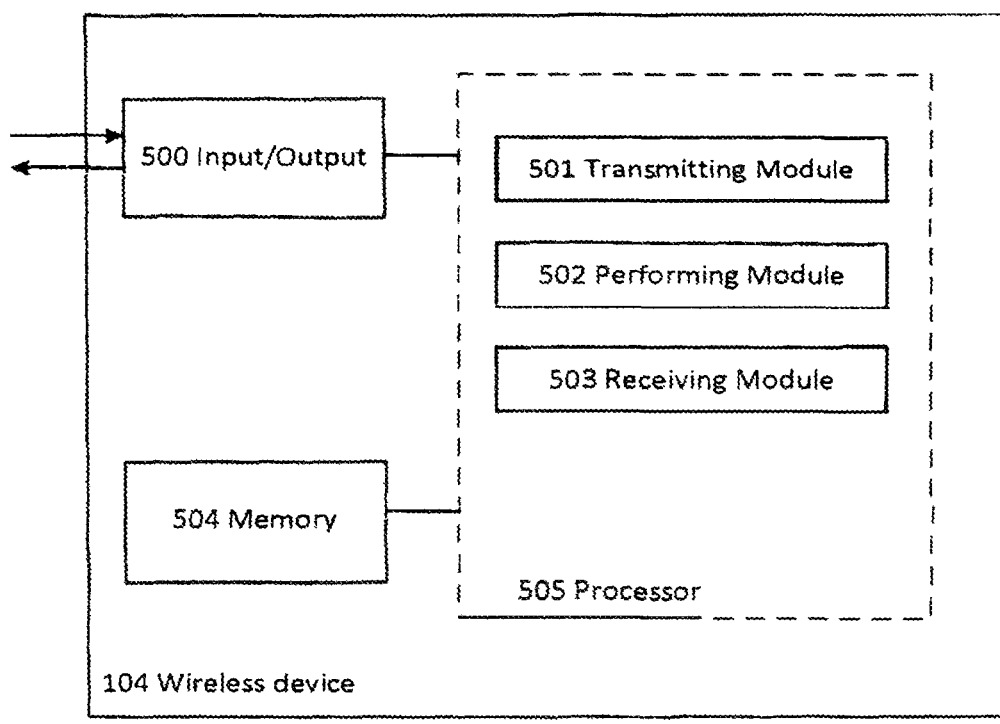
Fig. 5

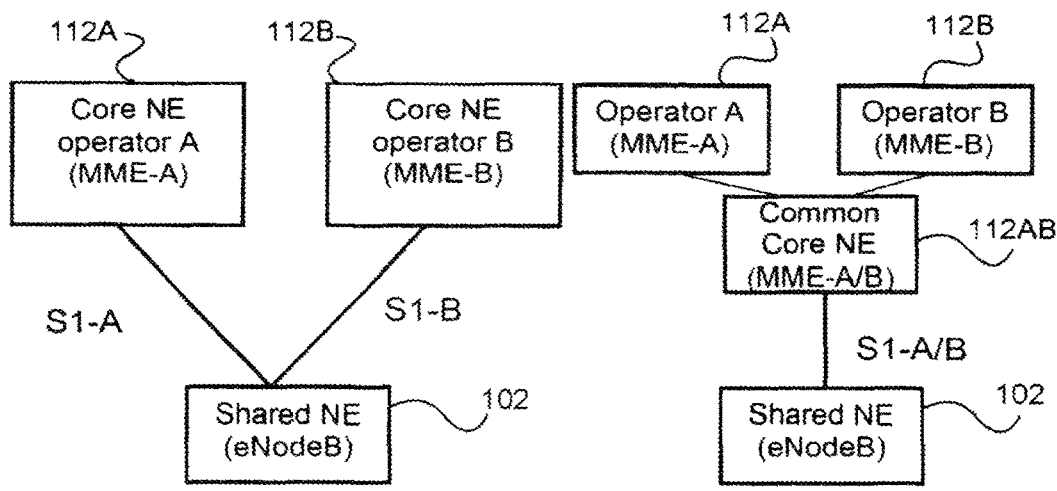

Fig. 7

| IE/Group Name | Presence | Range | IE type and reference | Semantics description |
|---|---|---|---|---|
| Overload Action | M | | ENUMERATED (Reject RRC connection establishments for non-emergency MO DT, Reject RRC connection establishments for Signalling, Permit Emergency Sessions and mobile terminated services only, ..., Permit High Priority Sessions and mobile terminated services only, Reject delay tolerant access) | |

Fig. 8

```
-- ASN1START

RRCConnectionRequest ::=          SEQUENCE {
    criticalExtensions                CHOICE {
        rrcConnectionRequest-r8           RRCConnectionRequest-r8-IEs,
        criticalExtensionsFuture          SEQUENCE {}
    }
}

RRCConnectionRequest-r8-IEs ::=   SEQUENCE {
    ue-Identity                       InitialUE-Identity,
    establishmentCause                EstablishmentCause,
    spare                         BIT STRING (SIZE (1))
}

InitialUE-Identity ::=            CHOICE {
    s-TMSI                            S-TMSI,
    randomValue                       BIT STRING (SIZE (40))
}

EstablishmentCause ::=            ENUMERATED {
                                  emergency, highPriorityAccess, mt-Access, mo-
Signalling,
                                  mo-Data, delayTolerantAccess-v1020, spare2,
spare1}

-- ASN1STOP
```

Fig. 11

| S-TMSI Range 1 (0..x) | PLMN ID 1 |
|---|---|
| S-TMSI Range 2 (X+1..y) | PLMN ID 2 |
|  |  |
| S-TMSI Range n (m..$2^{40}$) | PLMN ID N |

Fig. 12

MANAGING OVERLOAD IN AT LEAST ONE CORE NETWORK

RELATED APPLICATIONS

This application is a continuation of U.S. application Ser. No. 15/513,888, filed Mar. 23, 2017, which is a 371 of PCT/SE2015/051004, filed Sep. 25, 2015, which claims the benefit of U.S. Provisional Application No. 62/055,676, filed Sep. 26, 2014, the disclosures of which are fully incorporated herein by reference.

TECHNICAL FIELD

Embodiments herein relate generally to a wireless device, a shared radio network node and to methods therein. In particular they relate to the management of overload in at least one core network.

BACKGROUND

Communication devices such as terminals or wireless devices are also known as e.g. User Equipments (UE), mobile terminals, stations (STAs), wireless terminals and/or mobile stations. Such terminals are enabled to communicate wirelessly in a wireless communications network or cellular communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

The above terminals or wireless devices may further be referred to as mobile telephones, cellular telephones, laptops, or surf plates with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB, micro eNode B or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more Core Networks (CN).

3GPP LTE radio access standard has been written in order to support high bitrates and low latency both for uplink and downlink traffic. All data transmission is in LTE controlled by the radio base station.

Today, a UE, e.g. a wireless device, may be connected to a core network node experiencing an overload. Such a core network node may not operate properly. The reason for the overload experience may be too many UEs connected to the core network node at the same time. The overload may result in a deteriorated user experience for the user of the connected UE. In order to overcome this drawback, the base station, e.g. the eNB, connecting the UE to the core network may request the UE to go from connected mode to idle mode and to transmit a connection request to a second base station in order to be connected to a second core network node comprised in the core network. However, this will result in additional signalling that will not improve the user experience. Further, when the UE is connected to the second core network node it may be determined that the second core network node also is experiencing an overload, and thus the second base station may have to request the UE to go into idle mode and to transmit a connection request to a third base station, etc. This will result in even more additional signalling that will deteriorate the user experience further.

SUMMARY

According to a first aspect of embodiments herein, the object is achieved by a method performed by a shared Radio Network Node (RNN) for managing overload in at least one core network. The shared RNN is configured to serve a wireless device, wherein the wireless device and the shared RNN are configured to operate in a wireless communications network connected to the at least one core network.

The shared RNN receives a connection request from the wireless device. The connection request comprises a mapping parameter configured to map to a Mobility Management Entity (MME) comprised in the at least one core network and connected to the shared RNN, which MME is logically partitioned into several MMEs and configured to support multiple MME Codes (MMECs) each of which MMECs is pointing at a sharing operator. Further, the mapping parameter comprises an MMEC configured to map to one of the MMECs supported by the MME.

The shared RNN rejects or redirects the connection request when the MMEC configured to map to one of the MMECs supported by the MME is associated with an overload action.

According to a second aspect of embodiments herein, the object is achieved by a shared Radio Network Node (RNN) for managing overload in at least one core network. The shared RNN is configured to serve a wireless device, wherein the wireless device and the shared RNN are operable in a wireless communications network connected to the at least one core network.

The shared RNN is configured to receive a connection request from the wireless device. The connection request comprises a mapping parameter configured to map to a Mobility Management Entity (MME) comprised in the at least one core network and connected to the shared RNN, which MME is logically partitioned into several MMEs and configured to support multiple MME Codes (MMECs) each of which MMECs is pointing at a sharing operator. Further, the mapping parameter comprises an MMEC configured to map to one of the MMECs supported by the MME.

The shared RNN is further configured to reject or redirect the connection request when the MMEC configured to map to one of the MMECs supported by the MME is associated with an overload action.

According to a third aspect of embodiments herein, the object is achieved by a method performed by a wireless device for assisting a shared Radio Network Node (RNN) in managing overload in at least one core network. The wireless device is configured to be served by the shared RNN, and the wireless device and the shared RNN are configured to operate in a wireless communications network connected to the at least one core network.

The wireless device transmits a connection request to the shared RNN. The connection request comprises a mapping parameter configured to map to a Mobility Management Entity (MME) comprised in the at least one core network and connected to the shared RNN, which MME is logically partitioned into several MMEs and configured to support multiple MME Codes (MMECs) each of which MMECs is pointing at a sharing operator. Further, the mapping parameter comprises an MMEC configured to map to one of the MMECs supported by the MME. Thereby the wireless device assists the shared RNN in managing overload in the at least one core network.

According to a fourth aspect of embodiments herein, the object is achieved by a wireless device for assisting a shared Radio Network Node (RNN) in managing overload in at least one core network. The wireless device is configured to be served by the shared RNN, and the wireless device and the shared RNN are operable in a wireless communications network connected to the at least one core network.

The wireless device is configured to transmit a connection request to the shared RNN. The connection request comprises a mapping parameter configured to map to a Mobility Management Entity (MME) comprised in the at least one core network and connected to the shared RNN, which MME is logically partitioned into several MMEs and configured to support multiple MME Codes (MMECs) each of which MMECs is pointing at a sharing operator. Further, the mapping parameter comprises an MMEC configured to map to one of the MMECs supported by the MME. Thereby the wireless device assists the shared RNN in managing overload in the at least one core network.

Since the RNN receives a connection request comprising a mapping parameter configured to map to an MME comprised in the at least one core network and connected to the shared RNN, which MME is logically partitioned into several MMEs and configured to support multiple MMECs each of which MMECs is pointing at a sharing operator, and since the mapping parameter comprises an MMEC configured to map to one of the MMECs supported by the MME, it is possible to identify the sharing operator and to check if the sharing operator is experiencing an overload at the MME. Further, since the RNN rejects or redirects the connection request when the MMEC, configured to map to one of the MMECs supported by the MME, is associated with an overload action, the RNN is able to manage overload in the at least one core network. This results in an improved performance in the communications system.

Some Advantages of Some Embodiments

Some embodiments provide for the rejection of one or more UEs, such as e.g. the wireless device, that would otherwise connect to one or more CN nodes, e.g. the MME, in state of overload. This would allow the Overload Action Specified in the overload indication from the core network node, e.g. the MME, to the RNN to be fulfilled, given that such action currently comprises only the possibility of rejections. Unwanted UE connections to an overloaded CN node, e.g. an overloaded MME, would for example happen due to the possibility for the UE, e.g. the wireless device, of not finding any layer and/or cell to which to redirect, where redirection is assumed as an alternative to the action of rejection. In the latter case the UE, e.g. the wireless device, would immediately reconnect with the previous serving cell, namely it will reconnect via the MME in overload.

Some embodiments enable differentiated treatment of UEs, e.g. wireless device, during connection request, depending on the PLMN ID towards which the UE, e.g. the wireless device, attempts to connect. Such differentiation is of particular usefulness in RAN sharing scenarios, where multiple operators might share the same radio access cell but where CN nodes, e.g. the MMEs, per sharing operators can be affected differently by overload. The latter calls for differentiated access request treatment of UEs depending on the CN node, e.g. the MME, they are trying to connect to.

Some embodiments allow such differentiated treatment of UEs on the basis of an association between CN entities, possibly residing within the same CN node, e.g. the same MME, and PLMN identities and CN overload policies.

Some embodiments define new overload actions for UEs, e.g. wireless devices, that may not be rejected, or in general in case rejections are considered sub-optimal.

For the new overload actions introduced, some embodiments define new ways to perform release and redirect in cases where a target for redirection is not necessarily available in the form of an operational radio access network able to serve wireless terminals.

BRIEF DESCRIPTION OF DRAWINGS

Examples of embodiments herein are described in more detail with reference to attached drawings in which:

FIG. 2 is a flowchart schematically illustrating embodiments of a method in a shared RNN;

FIG. 3 is a block diagram schematically illustrating embodiments of a shared RNN;

FIG. 4 is a flowchart schematically illustrating embodiments of a method in a wireless device;

FIG. 5 is a block diagram schematically illustrating embodiments of a wireless device;

FIG. 7 schematically illustrates embodiments of architectures for shared RAN;

FIG. 8 is a tabular definition of the Overload Action IE in the S1: Overload Start Message;

FIG. 11 schematically illustrates information signaled by a UE in embodiments of a RRCConnectionsRequest message; and FIG. 12 schematically illustrates examples of mapping between S-TMSI ranges and sharing operator's PLMN IDs.

DETAILED DESCRIPTION

Figure 1:
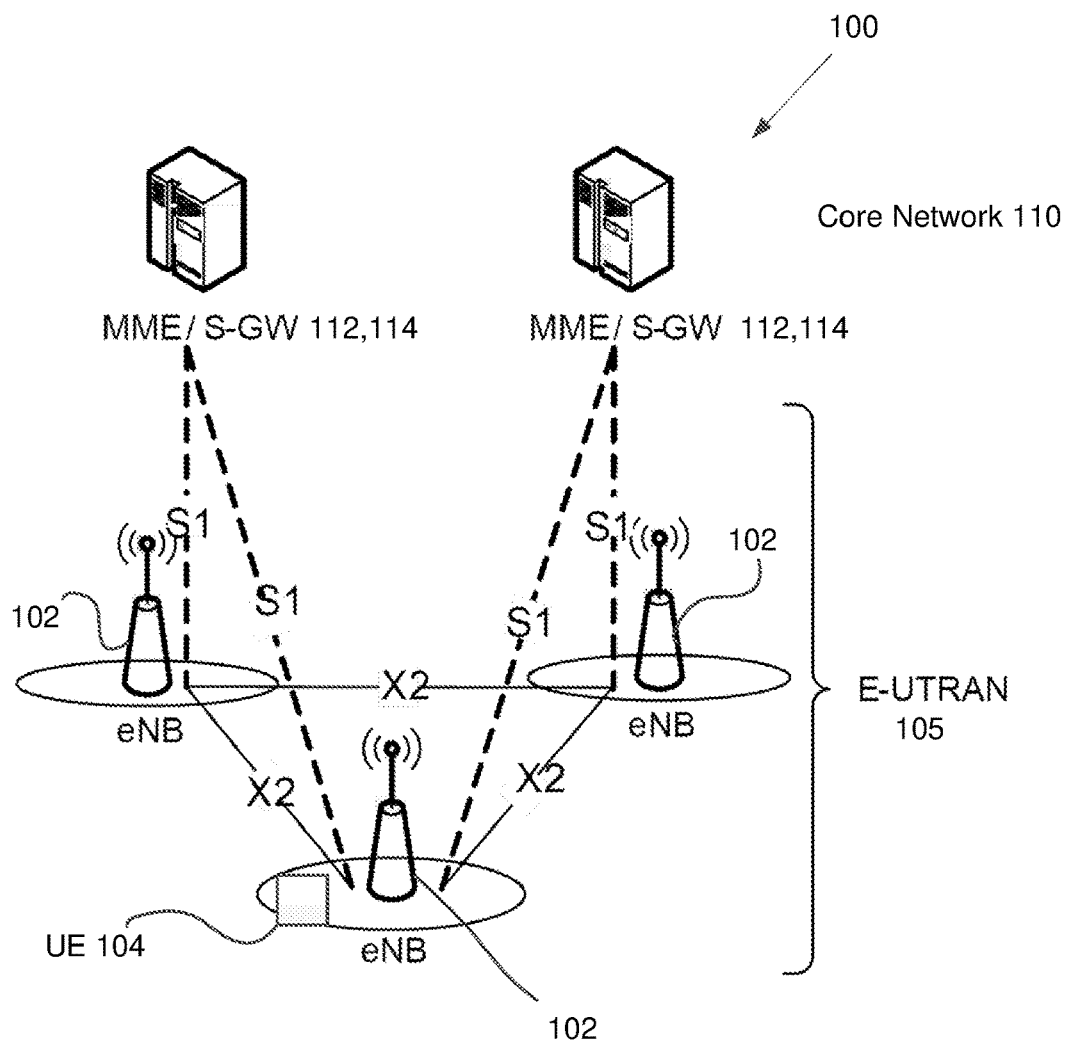
FIG. 1 schematically illustrates an LTE architecture showing logical interfaces between eNBs (X2) and between eNB and MME/S-GW (S1)

As part of developing embodiments herein, some problems with the state of the art communications systems will first be identified and discussed.

Today it is not possible to know the selected Public Land Mobile Network IDentity (PLMN ID) of a UE, e.g. a wireless device, at the time the eNB, e.g. an RNN, receives an RRCConnectionRequest message. This information is essential in order to be able to understand to which PLMN the UE is attempting to connect. For example, this information would indicate to which sharing operator in a Radio Access Network (RAN)/Core Network (CN) Sharing deployment the UE is trying to connect. The information is known only after the RRCConnectionRequest has been positively acknowledged by means of an RRCConnectionSetup message. Namely, the selected PLMN ID is known to the eNB, e.g. a shared RNN in the RAN/CN sharing deployment, only when the RRCConnectionSetupComplete message is received, which indicates completion of RRC Connection and at which point it is no more possible to reject the UE.

By the term "sharing operator" when used herein is meant an operator that share resources of equipment comprised in the communications system 100,110, e.g. the EPS in LTE, and/or resources handled by the equipment by one or more other operators.

Further, a sharing operator of the core network 110, e.g. the Evolved Packet Core (EPC) network in LTE, is indicated by the MME Code value.

Furthermore, a sharing operator of the wireless communications network 100, e.g. the E-UTRAN in LTE, is accessing and using the same time frequency resources associated to a cell served by an core network node, e.g. an MME.

By the wording RAN/CN Sharing deployment when used herein is meant a deployment wherein two or more operators are sharing a RAN and/or a CN.

A problem addressed by embodiments herein is therefore how to let the RAN, e.g. the wireless communications network by means of the RNN, decide whether an UE, the wireless device, shall be rejected or not purely on the basis of the information listed in the RRCConnectionRequest message.

In cases where the parameters signalled in RRCConnectionRequest are used to identify the selected PLMN of the UE, e.g. the parameters are pointing at the sharing operator hosting the UE, one problem to be solved is how to ensure that such parameters maintain their function when used in other procedures. For example, if the SAE-Temporary Mobile Subscriber Identity (S-TMSI, wherein SAE stands for System Architecture Evolution) is used to map the UE to a selected PLMN ID, it should be ensured that such parameter remains unique within the Paging area, e.g. within a shared cell, because the S-TMSI is used to identify a UE during Paging procedures. If more than one UE is given the same S-TMSI, the RAN-CN system would have to be dimensioned to support multiple Paging procedures per S-TMSI, when only one procedure is necessary. The latter would cause unnecessary RAN-CN over-dimensioning and unnecessary signalling of Paging messages over the CN-RAN interfaces and over the air. Therefore, in order to avoid failures in UE connections following erroneous Paging messages, parameters such as the S-TMSI shall be maintained unique within a Paging area.

By the expression "shared cell" when used herein is meant a cell shared by two or more sharing operators.

Another problem addressed by embodiments herein is the limitation in the actions available in the Overload Action Information Element (IE). In fact such actions only contemplate UE rejection and it might occur that rejections may not be actuated. Some embodiments herein also tackles the inclusion of different overload actions, which would not necessarily rely on RRC rejections.

Embodiments herein address the possibility of rejecting UEs, e.g. one or more wireless devices, at connection request attempt or release and redirect them in a differentiated way, which depends on the information reported by the UE at connection request, and/or on the CN node, e.g. an MME, to which the UE was previously or is currently registered.

In a first method of some embodiments herein, the UE, e.g. a wireless device, performs RRCConnectionRequest comprising one of S-TMSI or Random value. Embodiments herein foresees a mapping between the parameters provided by the UE at RRCConnectionRequest and a number of PLMN IDs. If a previous CN overload indication was received by the radio network node, e.g. the RNN, serving the connecting UE and if such overload regarded a CN node, e.g. the MME, serving one or more of the PLMN IDs associated to the parameters in RRCConnectionRequest, then the UE might be rejected accordingly.

In a second method of some embodiments herein, where for example it was not possible for the radio network node, e.g. the RNN, serving the connecting UE, e.g. the wireless device, to map parameters in the RRCConnectionRequest to one or more PLMN IDs, the overload indication may include alternative handling actions for the connecting UE. Such actions may comprise releasing the UE and redirecting it to another available layer.

Several embodiments are comprised herein.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Throughout this description, WLAN and 3GPP are used as example networks for illustrative purposes only, the general idea of all embodiments are applicable to steering between a cellular network, such as a 3GPP network, and other non-cellular network, such as other non-3GPP networks, based on technologies other than WLAN.

Terminologies

The following commonly terminologies are used in embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it may correspond to any type of radio network node or any network node, which communicates with at least a radio network node. Examples of network node are any radio network node stated above, core network node (e.g. MSC, MME etc), O&M, OSS, SON, positioning node (e.g. E-SMLC), MDT etc.

User equipment: In some embodiments the non-limiting term user equipment (UE) is used and it refers to any type of wireless device communicating with a network node in a communication system. Examples of UE are target device, device to device UE, machine type UE or UE capable of machine to machine communication, PDA, iPAD®, Tablet, mobile terminals, smart phone, laptop embedded equipped (LEE), laptop mounted equipment (LME), USB dongles etc.

The embodiments herein are exemplified to the case of the LTE technology. However, such embodiments may be applied to any other technology where the problem of deducing the serving operator of a mobile user for the purpose of handling the mobile user access to the radio access network according to a specific policy needs to be solved.

The 3rd Generation Partnership Project (3GPP) is working on a standardization of Release 12 of the Long Term Evolution (LTE) concept. The architecture of the LTE system is shown in FIG. 1. As schematically illustrated, the system comprises one or more radio access nodes, such as base stations referred to as evolved Node Bs (eNBs) in LTE, and one or more evolved packet core nodes, such as one or more Mobility Management Entities (MME) and one or more Serving Gateways (S-GW), herein sometimes referred to as MME/S-GW. The complete network is sometimes referred to as Evolved Packet System (EPS), wherein the radio network is referred to as Evolved UMTS Terrestrial Radio Access Network (E-UTRAN) and the packet switched core network is referred to as Evolved Packet Core (EPC). As illustrated in FIG. 1, an S1 interface connects the eNBs to the MME/S-GW, while an X2 interface connects peer eNBs.

As schematically illustrated in FIG. 1 embodiments herein relate to and may be implemented in a communications system 100. The communications system 100 may be an LTE system, e.g. an Evolved Packet system (EPS), a WCDMA system, an GSM system, any 3GPP cellular system, Worldwide Interoperability for Microwave Access (WIMAX) system, or any other communications system.

A wireless communications network 105 may be comprised in the communications system 100. The wireless communications network 105 may be an LTE RAN, such as an Evolved UMTS Terrestrial Radio Access network (E-UTRAN), a WCDMA RAN, an GSM RAN, any 3GPP cellular RAN, WIMAX radio access network or any other radio access network.

A core network 110 may be comprised in the communications system 100. The core network 110 may be an LTE Core network, e.g. an Evolved Packet Core (EPC) network, a WCDMA core network, an GSM core network, any 3GPP cellular core network, a WIMAX core network, or any other wireless communications core network or system.

Further, a core network node 112,114 may be comprised in the core network 110. The core network node 112,114 may be an LTE core network node, a WCDMA core network node, an GSM core network node, any 3GPP cellular core network node, a WIMAX core network node, or any other wireless communications core network or system node. In some embodiments herein, the core network node 112,114 is an MME 112 or an Serving Gateway (S-GW) 114.

A Radio Network Node (RNN) 102 is comprised in the wireless communications network 105. The RNN 102 may be a transmission point such as a radio base station, for example an eNodeB, also denoted eNB, a Home eNodeB, or a NodeB or any other network node capable to serve a wireless device, e.g. a user equipment or a machine type communication device in the communications network 105. In case of device-to-device (D2D) communication, the RNN 102 may be a wireless device. In such embodiments, the wireless device 104 may be referred to as a first wireless device and the RNN 102 may be referred to as a second wireless device, or vice versa.

In a RAN/CN sharing deployment, the RNN 102 is sometimes herein referred to as a shared RNN 102. By the expression "shared RNN" when used herein is meant that the resources of the RNN and the radio resources handled by the RNN are shared between multiple operators.

A wireless device 104 may be served by the RNN 102, when located within a geographical area served by the RNN 102. The wireless device 104, herein also referred to as a user equipment or UE, operates in the wireless communications network 105. The wireless device 104 may e.g. be a user equipment, a mobile terminal or a wireless terminal, a mobile phone, a computer such as e.g. a laptop, a Personal Digital Assistant (PDA) or a tablet computer, sometimes referred to as a tablet, with wireless capability, or any other radio network unit capable of communicating over a radio link in the wireless communications network 105. Please note that the term user equipment used in this document also covers other wireless devices such as Machine-to-Machine (M2M) devices, even though they may not have any user.

A method performed by the shared Radio Network Node (RNN) 102 for managing overload in at least one core network 110, will now be described with reference to the flow chart depicted in FIG. 2. As previously described, the shared RNN 102 is configured to serve the wireless device 104, and the wireless device 104 and the shared RNN 102 are configured to operate in the wireless communications network 105 connected to the at least one core network 110. The method comprises one or more of the following actions. It should be understood that actions may be taken in any suitable order and that actions may be combined.

Action 201

The shared RNN 102 receives a connection request from the wireless device 104. Thereby, the shared RNN 102 knows that the wireless device 104 wants to connect to the shared RNN 102.

The connection request comprises a mapping parameter configured to map to a MME 112 comprised in the at least one core network 110 and connected to the shared RNN 102. The MME 112 is logically partitioned into several MMEs and configured to support multiple MME Codes (MMECs), each of which MMECs is pointing at a sharing operator, and wherein the mapping parameter comprises an MMEC configured to map to one of the MMECs supported by the MME 112. This means that one of the MMECs supported by the MME 112 and the sharing operator may be identified, e.g. by the RNN 102, by means of the MMEC comprised in the mapping parameter. Thereby, the shared RNN 102 knows the identity of the MME 112 and the sharing operator.

In some embodiments, the mapping parameter further comprises a System Architecture Evolution, SAE, -Temporary Mobile Subscriber identity (S-TMSI) that provides an identification of the MME 112. Alternatively, the mapping parameter is a random value that provides an identification of the MME 112.

By the expression "the MME 112 is logical partitioned into several MMEs" when used herein is meant that the MME112 is configured to make use of multiple MME Code values, e.g. MMECs. The different MME Code values are used to refer to different sharing operators. A sharing operator may make use of more than one MME Code value but each MME Code value used may be unique for one sharing operator.

Action 202

In some embodiments, the shared RNN 102 rejects the connection request when the MMEC configured to map to one of the MMECs supported by the MME 112 is associated with an overload action. This means that the sharing operator associated with the MMEC and sharing the MME 112 is associated with an overload action at the MME 112, and therefore, the shared RNN 102 rejects the connection request. Thereby, the wireless device 104 will not be connected to the overloaded MME 112 and thus a deteriorated user experience is avoided.

The shared RNN 102 may reject the connection request based on one or more parameters signalled by the wireless device 104 during connection request.

When the MMEC supported by the MME 112 is identified, the RNN 102 may check whether the MMEC is associated with an overload action. This may be performed by checking whether or not the RNN 102 has received an indication of overload associated with the MMEC. The indication may have been received from the MME 112 or from another network node comprised in the core network 110 or in the wireless communications network 105.

Action 203

In some embodiments, the shared RNN 102 redirects the request when the MMEC configured to map to one of the MMECs supported by the MME 112 is associated with an overload action.

The shared RNN 102 may redirect the connection request based on one or more parameters signalled by the wireless device 104 during connection setup completion. Further, the shared RNN 102 may redirect the wireless device 104 to a different MME, e.g. a second MME, that has not indicated overload. The different MME, e.g. the second MME, may be an MME from the same MME pool as the overloaded MME 112 where the wireless device 104 is registered. Thus, the shared RNN 102 and the second MME may have an established S1-MME connection. In some embodiments, the second MME may be referred to as a redirecting target.

The term "redirecting target" refers to an access target indicated to the wireless device 104 by the shared RNN 102 when the shared RNN 102 uses RRC Connection release with included redirection information, i.e. redirected Carrier Information, which indicates target frequency bands of 3GPP accesses.

In some embodiments, the shared RNN 102 redirect the connection request by indicating, to the wireless device 104, a fictitious redirecting target that is not available or that cannot server the wireless device. The word "fictitious" refers to that the redirection target does not have to exist. The fictitious redirecting target may comprise an unused frequency and/or an identity of an RNN not in range and/or an identity of a cell not in use or not in range. Thus, there is no established S1-MME connection between the shared RNN 102 and the fictitious redirecting target.

Action 204

In some embodiments, the shared RNN 102 releases the wireless device 104 in dependence of an indication of overload. For example, the shared RNN 102 may release the wireless device 104 before it redirect the wireless device 104 to the second MME as mentioned in Action 203 above.

Thus, some embodiments herein relate to a method in the shared Radio Network Node, RNN, 102 for managing overload in at least one core network 110, wherein said RNN 102 is configured to serve a wireless device 104, wherein said wireless device 104 and said shared RNN 102 are operated in a wireless communications network 105 connected to said at least one core network 110. Said at least one core network 110 comprises one or more core network entities 112 connected to said shared RNN 102. Said one or more core network entities 112 are configured to support multiple core network entity codes that are configured to map to one or more core networks 110 supported at said shared RNN 102.

In some embodiments, for each multiple core network entity codes that are configured to map to one or more core networks 110 supported at said shared RNN 102 it may be configured an association to one or more PLMN ID as well as to one or more CN overload policies, where such policies may include different types of overload actions.

Further, said at least one core network 110 is operated by and serves at least one operator.

The shared RNN 102 receives a connection request from said wireless device 104, cf. action 201 of FIG. 2. Further, the shared RNN 102 rejects in action 202 or redirects in action 203 said connection request when or if a core network entity 112 comprised in said at least one core network 110 and connected to said shared NN 102 is overloaded. In other words, in case said core network entity 112 comprised in said at least one core network 110 and connected to said RNN 102 is overloaded, said RNN 102 rejects or redirects said connection request.

The shared RNN 102 may reject or redirect said connection request based on one or more parameters signaled by the wireless device during connection request or connection setup completion.

In some embodiments, said connection request comprises a mapping parameter encoded to comprise an identifier to said core network entity 112.

The mapping parameter may provide an identification of said core network entity 112, such as an SAE-Temporary Mobile Subscriber Identity, S-TMSI, or a Random value. It should be understood that an indication of MME overload may be signalled standalone and not as a response to a UE request. That means that the RNN, e.g. eNodeB, knows if the serving MME is overloaded when it receives a UE request.

Furthermore, the RNN 102 may release in action 204 said wireless device 104 in dependence of said indication of overload.

Thus, it may be no relation between an overload indication from a second MME and a UE being served by a first MME. In that case the first MME continues to serve the UE and the eNodeB does not apply any special handling of the UE since the overload indication refers to the second MME only. However, the eNodeB may redirect a UE to a different MME in case the serving MME has indicated overload and both the first and second MME are members of the same MME Pool. At such redirect the eNodeB will select an MME that has not indicated overload. That means that the eNodeB is at all times aware of which MMEs that may be selected and may be able to avoid selecting an MME which is indicating overload.

To perform the method for managing overload in the at least one core network 110, the shared RNN 102 may be configured according to an arrangement depicted in FIG. 3. As previously described, the shared RNN 102 is configured to serve the wireless device 104, and the wireless device 104 and the shared RNN 102 are configured to operate in the wireless communications network 105 connected to the at least one core network 110.

In some embodiments, the shared RNN 102 comprises an input and/or output interface 300 configured to communicate with one or more wireless devices, e.g. the wireless device 104, one or more radio nodes, such as one or more other RNNs, and one or more core network nodes such as MME 112 and/or S-GW 114. The input and/or output interface 300 may comprise a wireless receiver (not shown) and a wireless transmitter (not shown).

The shared RNN 102 is configured to receive, e.g. by means of a receiving module 301 being configured to receive, from the wireless device 104, a connection request. The receiving module 301 may be implemented by the wireless receiver or by a processor 305 of the shared RNN 102. The processor 305 will be described in more detail below.

The connection request comprises a mapping parameter configured to map to the MME 112 comprised in the at least one core network 110 and connected to the shared RNN 102. The MME is logically partitioned into several MMEs and configured to support multiple MME Codes (MMECs), each of which is pointing at a sharing operator. The mapping parameter comprises an MMEC configured to map to one of the MMECs supported by the MME 112. As previously mentioned, this means that one of the MMECs supported by the MME 112 and the sharing operator may be identified by the MMEC comprised in the mapping parameter. Thereby, the shared RNN 102 knows the identity of the MME 112 and the sharing operator.

As also previously mentioned, the mapping parameter may be an S-TMSI or a random value that provides an identification of the MME 112.

The shared RNN 102 may be configured to reject, e.g. by means of a rejecting module 302 being configured to reject, the connection request when the MMEC configured to map to the one or more MMECs supported by the MME 112 is associated with an overload action. As previously mentioned, this means that the sharing operator associated with the MMEC and sharing the MME 112 is associated with an overload action at the MME 112, and therefore, the shared RNN 102 is configured to reject the connection request. Thereby, the wireless device 104 will not be connected to the overloaded MME 112 and thus a deteriorated user experience is avoided.

The rejecting module 302 may be implemented by the processor 305 of the shared RNN 102.

In some embodiments, the shared RNN 102 is configured to reject the connection request by further being configured to reject the connection request based on one or more parameters signalled by the wireless device 104 during connection request.

In some embodiments, the shared RNN 102 is configured to redirect, e.g. by means of a redirecting module 303 being configured to redirect, the connection request when the MMEC configured to map to the one or more MMECs supported by the MME 112 is associated with an overload action. The redirecting module 303 may be implemented by the processor 305 of the shared RNN 102.

The shared RNN 102 may be configured to redirect the connection request by further being configured to redirect the connection request based on one or more parameters signalled by the wireless device 104 during connection setup completion.

In some embodiments, the shared RNN 102 is configured to redirect the connection request by further being configured to redirect the wireless device 104 to a different MME, e.g. a second MME, that has not indicated overload. The different MME, e.g. the second MME, may be an MME from the same MME pool as the overloaded MME 112 where the wireless device 104 is registered. Thus, the shared RNN 102 and the second MME may have an established S1-MME connection. In some embodiments, the second MME may be referred to as a redirecting target.

In some embodiments, the shared RNN 102 is configured to redirect the connection request by further being configured to indicate, to the wireless device 104, a fictitious redirecting target that is not available or that cannot server the wireless device. The fictitious redirecting target may comprise an unused frequency and/or an identity of an RNN not in range and/or an identity of a cell not in use or not in range.

Further, the shared RNN 102 may be configured to release, e.g. by means of a releasing module 304 being configured to release, the wireless device 104 in dependence of an indication of overload. The releasing module 304 may be implemented by the processor 305 of the shared RNN 102.

In some embodiments, the shared RNN 102 is configured to transmit, e.g. by means of a transmitting module 307 being configured to transmit, data or information to one or more wireless devices, such as the wireless device 104, one or more other radio nodes, and one or more other network nodes, such as the MME 112 or the S-GW 114. The transmitting module 307 may be implemented by the wireless transmitter or the processor 305 of the shared RNN 102.

The embodiments herein may be implemented through one or more processors, such as a processor 305 in a radio network node, e.g. the shared RNN 102, together with computer program code for performing the functions and actions of the embodiments herein. The program code may be implemented in one or several network nodes both in the cellular network and/or in the non-cellular network and/or in the communication device (e.g. UE and/or STA). The program code mentioned above may also be provided as a computer program product, for instance in the form of a data carrier carrying computer program code for performing the embodiments herein when being loaded into network node or communication device. One such carrier may be in the form of a CD ROM disc. It is however feasible with other data carriers such as a memory stick. The computer program code may furthermore be provided as pure program code on a server and downloaded to the network node or the communication device.

The radio network node, e.g. the shared RNN 102, further comprise a memory 306 comprising one or more memory units. The memory is arranged to be used to store obtained information, store data, configurations, schedulings, and applications etc. to perform the methods herein when being executed in the RAN or the communication device. Thus, the memory 306 may contain instructions executable by the processor 305, whereby the shared RNN 102 is operative to perform one or more of the actions described herein.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RAN, the network node and communication device perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Thus, some embodiments herein relate to a in a shared Radio Network Node, RNN, 102 for managing overload in at least one core network 110, wherein said shared RNN 102 is configured to serve a wireless device 104, wherein said wireless device 104 and said shared RNN 102 are operated in a wireless communications network 105 connected to said at least one core network 110. Said at least one core network 110 comprises one or more core network entities 112 connected to said shared RNN 102. Said one or more core network entities 112 are configured to support multiple core network entity codes that are configured to map to one or more core networks 110 supported at said shared RNN 102.

Further, said at least one core network 110 is operated by and serves at least one operator.

The shared RNN 102 is configured to, e.g. by means of a receiving module 1201, cf. FIG. 3, receive a connection request from said wireless device 104, and to, e.g. by means of a rejecting module 302 or a redirecting module 303, reject or redirect said connection request when or if a core network entity 112 comprised in said at least one core network 110 and connected to said shared RNN 102 is overloaded. In other words, in case said core network entity 112 comprised in said at least one core network 110 and connected to said RNN 102 is overloaded, said RNN 102 rejects or redirects said connection request.

As previously mentioned, the shared RNN 102 may be configured to reject or redirect said connection request based on one or more parameters signaled by the wireless device during connection request or connection setup completion.

The receiving module 301 may be a wireless receiver of the RNN102. Further, the rejecting module 302 and/or the redirecting module 303 may be a processor 1205 of the shared RNN 102.

As previously mentioned, said connection request comprises a mapping parameter that is configured to map to said core network entity 112.

In some embodiments, the share RNN 102 is further configured to, by means of, e.g. the receiving module 301, receive an indication of overload from said core network entity 112.

Further, the shared RNN 102 may be configured to, e.g. by means of a releasing module 304, release said wireless device 104 in dependence of said indication of overload.

The releasing module 304 may be a processor 305 of the shared RNN 102.

In some embodiments, the shared RNN 102 comprises an input and/or output interface 300 configured to communicate with one or more other communication devices, one or more radio network nodes or one or more wireless devices.

The RNN 102 may further comprise a transmitting module 307. The transmitting module 307 may be a wireless transmitter of the shared RNN 102.

A method performed by the wireless device 104 for assisting the shared RNN 102 in managing overload in at least one core network 110, will now be described with reference to the flow chart depicted in FIG. 4. As previously described, the wireless device 104 is served by the shared RNN 102, and the wireless device 104 and the shared RNN 102 are operating in the wireless communications network 105 connected to the at least one core network 110. The method comprises one or more of the following actions. It should be understood that actions may be taken in any suitable order and that some actions may be combined.

Action 401

The wireless device 104 transmits a connection request to the shared RNN 102. The connection request comprises a mapping parameter configured to map to the MME 112 comprised in the at least one core network 110 and connected to the shared RNN 102. As previously mentioned, the MME 112 is logically partitioned into several MMEs and configured to support multiple MMECs, each of which MMECs is pointing at a sharing operator. Further, the mapping parameter comprises an MMEC configured to map to one of the MMECs supported by the MME 112. Thus, the shared RNN 102 will receive information about the MME 112 to which the wireless device 104 wants to connect and if that MME 112 is experiencing an overload, the shared RNN 102 may reject or redirect the connection request. Thereby, the wireless device 104 assists the shared RNN 102 in managing overload in the at least one core network 110.

As previously mentioned, the mapping parameter may be an S-TMSI or a random value that provides an identification of the MME 112.

Action 402

In some embodiments, the wireless device 104 receives, from the shared RNN 102, a fictitious redirecting target that is not available or that cannot server the wireless device.

The fictitious redirecting target may comprise an unused frequency and/or an identity of an RNN not in range and/or an identity of a cell not in use or not in range.

Thus, embodiments herein relate to a method in a wireless device 104 for assisting a shared Radio Network Node, RNN, 102 in managing overload in at least one core network 110, cf. FIG. 1, wherein said wireless device 104 is served by said shared RNN 102, wherein said wireless device 104 and said shared RNN 102 are operated in a wireless communications network 105 connected to said at least one core network 110. Said at least one core network 110 comprises one or more core network entities 112 connected to said shared RNN 102. Said one or more core network entities 112 are configured to support multiple core network entity codes that are configured to map to one or more core networks 110 supported at said shared RNN 102.

Further, said at least one core network 110 is operated by and serves at least one operator.

The wireless device 104 transmits a connection request to said shared RNN 102, cf. action 401 of FIG. 4. Thereby, said shared RNN 102 rejects or redirects said connection request when or if a core network entity 112 comprised in said at least one core network 110 and connected to said shared RNN 102 is overloaded. In other words, in case said core network entity 112 comprised in said at least one core network 110 and connected to said RNN 102 is overloaded, said RNN 102 rejects or redirects said connection request.

In this document the terms "core network entity" and core network node" may be used interchangeably. Further, it should be understood that in some embodiments the core network may be a virtualized core network, i.e. a core network provided via a computer server farm. Thus, in some embodiments, the core network entities and/or nodes may be virtualized core network entities and/or nodes.

In some embodiments, the core network entity 112 is an MME and the core network entity code is an MME code (MMEC). The MME is the communication peer which may choose to indicate overload to the RNN, e.g. the eNodeB. However, it should be understood that the MME may also do so on behalf of any node in the core network. The MME overload may be triggered by explicit load information from a different node, or the MME may detect overload in a different core node when detecting an abnormal signalling behaviour from that node.

Further, the overload indication is provided by the MME where the UE is registered. Being registered is the same as to say that the UE may not be served by a different MME unless 1) the overloaded MME transfer control to the new MME, or 2) the UE re-attaches to the new MME. So 1) or 2) is the result if eNodeB selects a different MME for the UE. However, both 1) and 2) have some drawbacks. With 1) the overloaded MME is required to transfer control, something that is likely to fail since the MME is overloaded. With 2) and at re-attach the UE will be removed from all established services. As a result the UE may cause massive signalling to re-establish these directly after the re-attach, hence adding to the network load in an overload scenario.

In some embodiments, said connection request comprises a mapping parameter encoded to comprise an identifier to said core network entity 112.

The mapping parameter may provide an identification of said core network entity 112, such as an SAE-Temporary Mobile Subscriber Identity, S-TMSI, or a Random value.

It should be understood that the UE may by standard be associated with more than one 3GPP access GERAN, UTRAN, E-UTRAN and to some extent also separately per domain (CS,PS). However, a connection request by a UE is tailored such that it may only be handled by a specific node type and domain. That means that a mapping should be to a specific core node to enable the RNN to route signalling to a specific and not an arbitrary destination node based on the mapping parameter.

To perform the method for assisting the shared RNN 102 in managing overload in the at least one core network 110, the wireless device 104 may be configured according to an arrangement depicted in FIG. 5. As previously described, the wireless device 104 is configured to be served by the shared RNN 102, and the wireless device 104 and the shared RNN 102 are configured to operate in the wireless communications network 105 connected to the at least one core network 110.

In some embodiments, the wireless device 104 comprises an input and/or output interface 500 configured to communicate with one or more radio nodes, such as one or more RNNs e.g. the shared RNN 102. The input and/or output interface 500 may comprise a wireless receiver (not shown) and a wireless transmitter (not shown).

In some embodiments, the wireless device 104 is configured to transmit, e.g. by means of a transmitting module 501 being configured to transmit a connection request to the shared RNN 102. The transmitting module 501 may be implemented by the wireless transmitter or the processor 505 of the wireless device 104.

The connection request comprises a mapping parameter configured to map to the MME 112 comprised in the at least one core network 110 and connected to the shared RNN 102. As previously mentioned, the MME 112 is logically partitioned into several MMEs and configured to support multiple MMECs, each of which MEECs is pointing at a sharing operator. Further, the mapping parameter comprises an MMEC configured to map to one of the MMECs supported by the MME 112. Thereby, the wireless device 104 assists the shared RNN 102 in managing overload in the at least one core network 110.

As previously mentioned, the mapping parameter may be an S-TMSI or a random value that provides an identification of the MME 112.

In some embodiments, the wireless device 104 is configured to perform, e.g. by means of a performing module 502 being configured to perform, processing of received data or of data to be transmitted. The performing module 502 may be implemented by the processor 505 of the wireless device 104.

The wireless device 104 may be configured to receive, e.g. by means of a receiving module 503 being configured to receive, from the shared RNN 102, a fictitious redirecting target that is not available or that cannot server the wireless device.

The fictitious redirecting target may comprise an unused frequency and/or an identity of an RNN not in range and/or an identity of a cell not in use or not in range.

The receiving module 503 may be implemented by the wireless receiver or by a processor 505 of the wireless device 104. The processor 505 will be described in more detail below.

The embodiments herein may be implemented through one or more processors, such as a processor 405 in the communication device, e.g. the wireless device 104, together with computer program code for performing the functions and actions of the embodiments herein. The program code may be implemented in one or several network nodes both in the cellular network and/or in the non-cellular network and/or in the communication device (e.g. UE and/or STA). The program code mentioned above may also be provided as a computer program product, for instance in the form of a data carrier carrying computer program code for performing the embodiments herein when being loaded into network node or communication device. One such carrier may be in the form of a CD ROM disc. It is however feasible with other data carriers such as a memory stick. The computer program code may furthermore be provided as pure program code on a server and downloaded to the network node, e.g. the shared RNN 102, or the communication device, e.g. the wireless device 104.

The communication device, e.g. the wireless device 104, may further comprise a memory 504 comprising one or more memory units. The memory is arranged to be used to store obtained information, store data, configurations, schedulings, and applications etc. to perform the methods herein when being executed in the RAN or the communication device. Thus, the memory 504 may contain instructions executable by the processor 505, whereby the wireless device 104 is operative to perform one or more of the actions described herein.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RAN, the network node and communication device perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Thus, some embodiments herein relate to a wireless device 104 for assisting a shared Radio Network Node, RNN, 102 in managing overload in at least one core network 110, cf. FIG. 1, wherein said wireless device 104 is served by said shared RNN 102, wherein said wireless device 104 and said shared RNN 102 are operated in a wireless communications network 105 connected to said at least one core network 110. Said at least one core network 110 comprises one or more core network entities 112 connected to said shared RNN 102. Said one or more core network entities 112 are configured to support multiple core network entity codes that are configured to map to one or more core networks 110 supported at said shared RNN 102.

Further, said at least one core network 110 is operated by and serves at least one operator.

The wireless device 104 is configured to, e.g. by means of a transmitting module 501, transmit a connection request to said shared RNN 102, cf. FIG. 5. Thereby said shared RNN 102 is configured to reject or redirect said connection request when or if a core network entity, e.g. the MME 112, comprised in said at least one core network 110 and connected to said shared RNN 102 is overloaded. In other words, in case said core network entity, eg.g. the MME 112, comprised in said at least one core network 110 and connected to said RNN 102 is overloaded, said RNN 102 rejects or redirects said connection request.

The shared RNN 102 may be configured to reject or redirect said connection request based on one or more parameters signaled by the wireless device during connection request or connection setup completion.

The transmitting module 501 may be a processor 505 of the wireless device 104.

As previously mentioned, said connection request comprises a mapping parameter encoded to comprise an identifier to said core network entity 112.

The mapping parameter may provide an identification of said core network entity 112, such as an SAE-Temporary Mobile Subscriber Identity, S-TMSI, or a Random value.

Embodiments herein comprise one or more other modules configured to realise features and to perform actions described herein.

Figure 6:
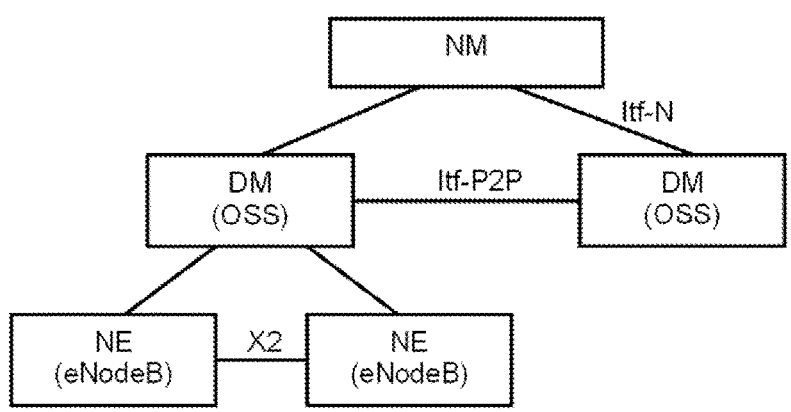
FIG. 6 schematically illustrates an embodiment of a management system architecture.

A management system is schematically shown in FIG. 6. As schematically illustrated, two Node Elements (NE), also referred to as eNodeBs, are managed by a Domain Manager (DM). The DM may also be referred to as the Operation and Support System (OSS). A DM may further be managed by a Network Manager (NM). Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM.

By means of configuration via the DM, NM and related interfaces, functions over the X2 and S1 interfaces may be carried out in a coordinated way throughout the Radio Access network (RAN), eventually involving the Core Network, i.e. MME and S-GWs.

CN Architecture in RAN Sharing

In a shared RAN scenario, e.g. a shared RAN scenario implementing embodiments disclosed herein, the core network elements, e.g. an MME 112A, 112B, 112AB, may either be per operator or shared, as schematically shown in the case of the control plane in FIG. 7. The scenario on the left-hand side of FIG. 7, wherein the RAN, e.g. the wireless communications network 105 by means of the shared RNN 102, is shared but the CN nodes, e.g. the MMEs 112A, 112B, are not shared, is called Mobile Operator Core Network (MOCN). As schematically illustrated in FIG. 7, left-hand side, the RNN 102 is shared by a core network node, e.g. the MME 112A, of an operator A, and a core network node, e.g. the MME 112B, of an operator B. The shared RNN 102 communicates with the core network node, e.g. the MME 112A, over a communication interface S1-A and with the core network node, e.g. the MME 112B, over a communication interface S1-B.

The scenario on the right-hand side of FIG. 7, wherein the RAN, e.g. the wireless communications network 105 by means of the shared RNN 102, and the CN, e.g. the CN 110 by means of the MME 112AB operating in CN, are shared, is called GateWay Core Network (GWCN). As schematically illustrated in FIG. 7, right-hand side, a common core network node, e.g. the MME 112AB, is shared by a core network node, e.g. the MME 112A, of the operator A, and a core network node, e.g. the MME 112B, of the operator B. Further, the shared core network node, e.g. the MME 112AB, is connected to the shared RNN 102. The shared RNN 102 communicates with the shared common core network node, e.g. the MME 112AB, over a communication interface S1-A/B.

Load Information from E-UTRAN to the Core Network

In the example of LTE, in order to indicate a situation of signalling overload at the MME, e.g. the MME 112, 112A, 112B, 112AB, a procedure called S1:Overload Start/S1: Overload Stop is defined in 3GPP TS 36.413 V12.1.0, "S1AP Protocol", wherein the MME, e.g. the MME 112, 112A, 112B, 112AB may inform the eNB, e.g. the shared RNN 102, about a signalling overload.

The Overload Start and Overload Stop messages are sent by the MME, e.g. the MME 112, 112A, 112B, 112AB, to an eNB, e.g. the shared RNN 102. The Overload Start indicates the occurrence of an overload situation in the MME, e.g. the MME 112, 112A, 112B, 112AB, and it specifies an overload action, which is defined in the Overload Action IE shown in FIG. 8.

As shown in FIG. 8, the actions that the MME, e.g. the MME 112, 112A, 112B, 112AB, may indicate to the eNB in order to mitigate signalling traffic are all specified as "rejections". Such rejections have to happen at RRC protocol level. Namely, when a UE, e.g. the wireless device 104, attempts to connect to the eNB, e.g. the shared RNN 102, and if such UE is going to be connected to the overloaded MME, e.g. the MME 112, 112A, 112B, 112AB, the UE, e.g. the wireless device 104, shall be rejected according to the criteria specified in the Overload Action IE.

The 51: Overload Stop message serves the purpose of signalling to an eNB, e.g. the shared RNN 102, that the overload situation at the MME, e.g. the MME 112, 112A, 112B, 112AB, has ended and normal operation shall resume.

Radio Resource Control (RRC) Connection Procedures

Figure 9:
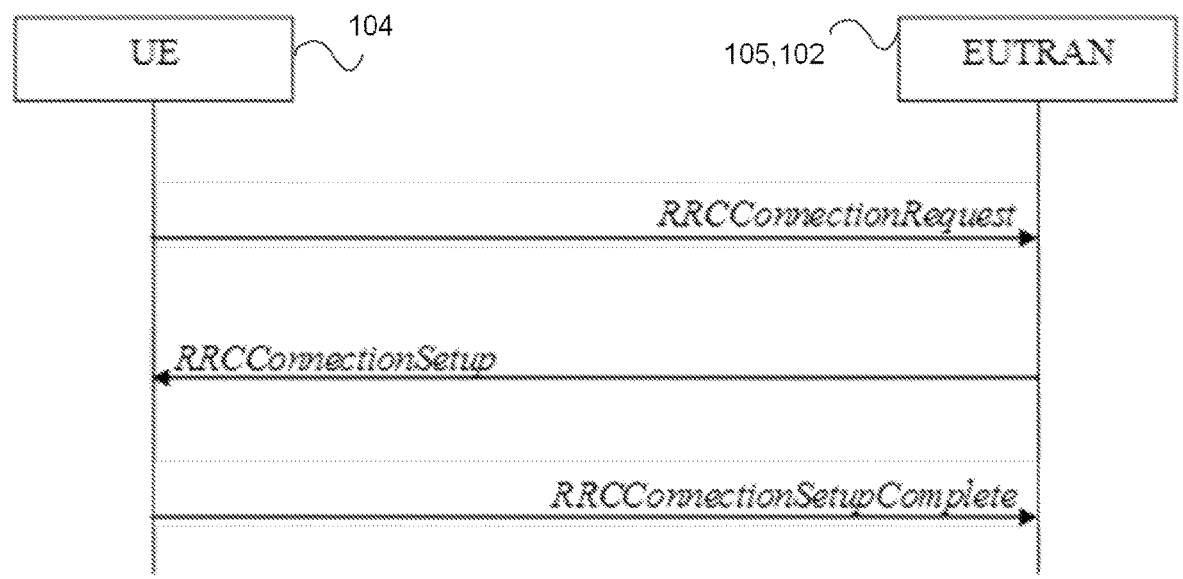
FIG. 9 is a signaling diagram schematically depicting embodiments of a successful RRC connection establishment.
Figure 10:
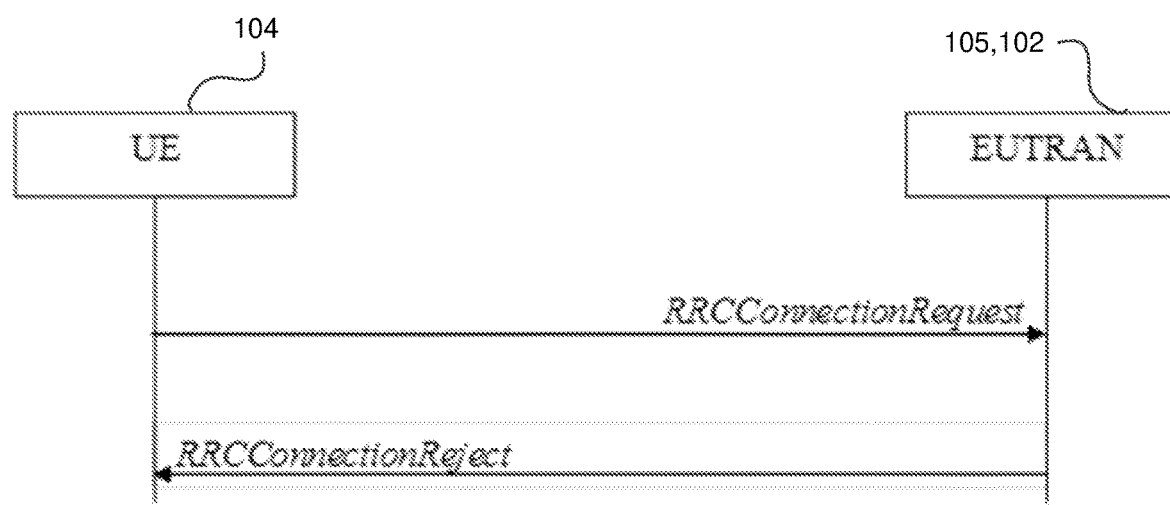
FIG. 10 is a signaling diagram schematically depicting embodiments of a unsuccessful RRC connection establishment.

In the example of LTE, RRC procedures for UE connection establishment are as shown in FIG. 9 and FIG. 10, see 3GPP TS 36.331 V12.1.0, "RRC Protocol".

An important detail to highlight is that an RRCConnectionReject message may only be sent after an RRCConnectionRequest. Namely, if the UE, e.g. the wireless device 104, already sent an RRCConnectionSetupComplete the connection may not be rejected anymore. In this case one common way to steer the UE, e.g. the wireless device 104, to a different access point is to use the release with redirection procedure, which implies the eNB, e.g. the shared RNN 102, to request that the UE, e.g. the wireless device 104, goes to Idle mode and reconnects to a new cell, frequency, Radio Access Technology (RAT) or in general access point opportunely specified in the release message.

Another important detail to be mentioned is that a UE, e.g. the wireless device 104, is able to signal a selected Public Land Mobile Network IDentity (PLMN ID) only via the RRCConnectionSetupComplete message. In a RAN Sharing deployment, the Selected PLMN ID is the main indicator of the PLMN (i.e. the sharing operator) to which the UE, e.g. the wireless device 104, needs to be connected. Hence, in cases of shared CN architectures, where MMEs, e.g. the MME 112, 112A, 112B, 112AB, of different operators may be selected by UEs, e.g. the wireless device 104, connecting to the same cell, it is important to deduce the PLMN ID of the home operator for the UE, e.g. the wireless device 104, because in case of signalling overload at a given MME, e.g. the MME 112, 112A, 112B, 112AB, associated with certain PLMN IDs it is important to reject UEs, e.g. the wireless device 104, on the bases of their selected PLMN. In other words, if an MME, e.g. the MME 112, 112A, 112B, 112, supporting PLMN ID=x signals an Overload Start to an eNB, e.g. the shared RNN 102, the eNB should be able to identify the selected PLMN ID of a connecting UE, e.g. the wireless device 104, in order to decide whether to accept or reject such UE.

However, the only information signalled by a UE, e.g. the wireless device 104, in the RRCConnectionRequest message is given in FIG. 1 (see 3GPP TS 36.331 V12.1.0, "RRC Protocol").

It is clear that none of these information points at a selected PLMN ID for the connecting UE, e.g. the wireless device 104, which is communicated after RRCConnectionRequest, in the RRCConnectionSetupComplete message.

Method Based on UE Reported Parameters

As previously described, a UE, e.g. the wireless device 104, may attempt connection establishment to a given cell by means of RRC procedures. The message used in the case of LTE is the RRCConnectionRequest, which may comprise one of two possible parameters: an S-TMSI or a Random Value. The Random value parameter may be a 40 bit random value and the purpose of the parameter may be to enable the eNodeB, e.g. the shared RNN 102, to identify the request as coming from a specific UE, e.g. the wireless device 104, based on the 40 bit random value which 40 bit random value most likely will not correspond a Random value provided by a different UE. Cf. 3GPP TS 36.331 and message RRCConnectionRequest.

In some first embodiments, the case where the UE, e.g. the wireless device 104, reports an S-TMSI or equivalent identifier containing identifiers for a CN node, e.g. the MME 112, 112A, 112B, 112AB, is addressed. In fact the S-TMSI is defined as follows:

<S-TMSI>=<MMEC><M-TMSI>, wherein the MMEC is an MME Code, namely an identifier for an MME, e.g. the MME 112, 112A, 112B, 112AB, that is unique within the MME Pool to which the MME, e.g. the MME 112, 112A, 112B, 112AB, belongs as well as unique within any overlapping areas between two MME pools. In this embodiment it is proposed that even in a MOCN case, where different operators connect to a shared eNB, e.g. the shared RNN 102, via different MMEs, e.g. the MME 112, 112A, 112B, 112, the MMEC of each connecting MME, e.g. the MME 112, 112A, 112B, 112, should be unique at least amongst the group of MMEs connecting to the shared eNB. The latter is to guarantee uniqueness of the S-TMSI, which contains the MMEC and that is present in the Paging message sent to UEs, e.g. the wireless device 104, connected to the shared cells of the shared eNB, e.g. the shared RNN 102.

The MMEC included in the UE reported identifier may be associated to the MME, e.g. the MME 112, 112A, 112B, 112, to which the UE, e.g. the wireless device 104, is registered.

The M-TMSI is a UE identifier to uniquely identify the UE, e.g. the wireless device 104, within the MME, e.g. the MME 112, 112A, 112B, 112AB, where it is registered.

In a similar way the methods highlighted in these embodiments may be applied to other technologies wherein one or more identifiers sent by the UE, e.g. the wireless device 104, at connection request may be mapped to CN nodes, e.g. the MME 112, 112A, 112B, 112AB, in situations of overload. For example, in the case of UTRAN systems, the UE, e.g. the wireless device 104, sends in RRCConnectionRequest one or more identities similar to those sent in LTE, which could be subjects to the methods explained herein.

When an MME, e.g. the MME 112, 112A, 112B, 112AB, signals to an eNB, e.g. the shared RNN 102, an S1: Overload Start message, the message will comprise one or more GUMMEIs. A GUMMEI is defined as follows (see TS23.003 V12.2.0, "Numbering, addressing and identifications"):

<GUMMEI>=<MCC><MNC><MME Identifier>, wherein

<MME Identifier>=<MME Group ID><MME Code>, and

<PLMN ID>=<MCC><MNC>

Therefore, it may be appreciated how the list of GUMMEIs comprised in the S1: Overload Start message may lead to the list of MMECs corresponding to the MMEs, e.g. the MME 112, 112A, 112B, 112, for which the overload is started. It may be seen also that the list of GUMMEIs may also provide a list of PLMN IDs. Namely, it is possible to deduce for which PLMN ID the overload is happening.

In some embodiments it is proposed that in all cases of RAN sharing, namely both MOCN and GWCN, the CN node, e.g. the MME 112, 112A, 112B, 112, connecting to the shared eNB, e.g. the shared RNN 102, is "partitioned" in different MMECs. Namely, even if the scenario is GWCN it is proposed that the CN node, e.g. the MME 112, 112A, 112B, 112AB, connected to the shared RAN node, e.g. the shared RNN 102, supports different MMECs, each pointing at a sharing operator or in general associated to different PLMN IDs served by the shared cell. With such assumption it is possible to deduce from the S-TMSI reported by the UE, e.g. the wireless device 104, at RRCConnectionRequest the MMEC to which the UE, e.g. the wireless device 104, was connected at the time the S-TMSI was assigned. This will also reveal the selected PLMN of the UE, e.g. the wireless device 104, at the time the S-TMSI was assigned.

It is therefore possible to map the UE, e.g. the wireless device 104, to an MMEC and to check whether such MMEC was subject to an overload action. In case the MMEC corresponds to a logical MME for which an Overload Start was sent, the UE attempting connection may be subject to the Overload Action specified.

This may be advantageous in situations wherein a per sharing operator overload actions need to be provided. In such situations, some embodiments herein provide for one or more core network node(-s) 112 to be connected to a shared RNN, e.g. the shared RNN 102, which is configured to support multiple MMECs. By assigning an S-TMSI, i.e. by assigning a different S-TMSI to UEs, e.g. the wireless device 104, connected to the same shared cell served by the same shared RNN 102 independently of the serving operator, the S-TMSI may comprise the MMEC with which the core network node, e.g. the MME 112, 112A, 112B, 112AB, was configured.

Further, sharing operators may be identified by an opportune partition of the S-TMSI space, wherein the shared RNN 102 is configured to understand the mapping between the S-TMSI range and the sharing operator, i.e. the serving PLMN ID of the UE, e.g. the wireless device 104.

It is worth pointing out that the above methods of partitioning or structuring the S-TMSI in a specific way come with the limitation of a reduction in the available S-TMSI range per sharing operator. Namely, a sharing operator would be able to serve less UEs in a shared cell than in a non-shared cell. Nevertheless, the shortfalls of a reduced S-TMSI space are overcome by the advantage of tailored per-sharing-operator actions in case of CN overload.

In some implementation specific embodiments, one or more core network entities, e.g. the MME 112, 112A, 112B, 112, connecting to the shared RNN 102, e.g. shared eNB, may be configured to support multiple core network node codes, e.g. MMECs, where the configuration consists of mapping such MMECs to one or more of the PLMN IDs supported at the shared eNB and where one or more of such MMECs may map to a sharing operator. The configuration may entail to associate to each group of one or more MMECs specific Overload Actions. Therefore, while it would appear to the eNB that an MME, e.g. the MME 112, 112A, 112B, 112, is connecting to it, that MME, e.g. the MME 112, 112A, 112B, 112AB, may be logically partitioned in several MMEs, each supporting a subset of the shared PLMN IDs and each associated to specific Overload Actions. In such embodiments the logical partition associated to one or more MMECs will also correspond to an S-TMSI range that will be made unique by means of containing the unique MMEC corresponding to the logical CN partition to which the UE, e.g. the wireless device 104, registered last.

Thus, according to some embodiments herein, the core network node codes, e.g. MMECs, may be mapped to different sharing operators. In other words, the core network node codes may be mapped to one or more PLMN ID corresponding to a different sharing operator. Further, different overload actions may be configured for each core network node code at implementation. Some example of overload actions are to reject UE connections that are not for emergency services or to release and redirect UEs connecting anew. Hence, an implementation specific way of using the MMEC partition may achieve that upon reception of a well formulated S-TMSI, the eNB, e.g. the shared RNN 102, is able to understand the sharing operator to which the UE, e.g. the wireless device 104, belongs and the overload action to be applied to it in case the core network node, e.g. the MME 112, 112A, 112B, 112, e.g. a virtual CN node, identified by the MMEC in the S-TMSI has indicated an overload.

By the expression "virtual CN node" is herein meant a process hosted in a single CN node which is configured and associated to a sharing operator whose CN, e.g. the CN 110, connects to the CN node but for which the CN node is not part of the operator's CN, e.g. the CN 110.

In some other embodiments, the case where mapping between MMEC and sharing operator (i.e. PLMN ID) may not be deduced is taken into consideration. This may be the case where a CN node, e.g. the MME 112, 112A, 112B, 112AB, with a single MMEC (for example In GWCN mode) is connected to a shared eNB, e.g. the shared RNN 102. In this case the list of GUMMEIs comprised in the S1: Overload Start message may still point at the PLMN ID of the sharing operator for which the overload was initiated, allowing the shared eNB, e.g. the shared RNN 102, to understand to which PLMN ID the overload applies. In this case a proposed solution is to enable a partitioning of the S-TMSI space where sub-ranges of the S-TMSI values may point at specific PLMN IDs. An example of how such partitioning may be achieved is shown in FIG. 12.

As schematically illustrated in FIG. 12, a S-TMSI value in range 1, i.e. between 0 and x, is mapped to PLMN ID 1, and a S-TMSI value in range 2, i.e. between x+1 and y, is mapped to PLMN ID 2, etc. Further, a S-TMSI value in range n, i.e. between m and 240, is mapped to PLMN ID N. In some embodiments, x is equal to 274877906944, y is equal to 549755813888, and m is equal to 824633720832.

With the partitioning exemplified in the FIG. 8 it is possible to allow an eNB, e.g. the shared RNN 102, to understand what selected PLMN ID the UE, e.g. the wireless device 104, had at the time of S-TMSI assignment. Therefore, it is possible for an eNB, e.g. the shared RNN 102, to treat the UE, e.g. the wireless device 104, according to the Overload Action specified per PLMN ID in the S1: Overload Start message.

In another embodiment a similar mapping to what is shown in FIG. 12 may be applied to the Random value that may substitute the S-TMSI in the RRCConnectionRequest. With such mapping it is possible for the eNB, e.g. the shared RNN 102, to understand the selected PLMN ID at the time the Random Value was assigned.

It should be noted that in the case of S-TMSI partitioning above it may be claimed that the S-TMSI space per sharing operator would be reduced. Hence, it may be claimed that overlapping S-TMSI ranges may be used per sharing operator, i.e. per PLMN ID. Namely, the latter method may rely on:

use of overlapping S-TMSI ranges per PLMN ID, which would increase the overall amount of S-TMSI available in the shared cell, and identification of the selected PLMN ID for the accessing UE, e.g. the wireless device 104, at reception from the eNB, e.g. the shared RNN 102, of the RRCConnectionSetup message, wherein the selected PLMN ID is specified.

Note that in the latter method it may still be possible to maintain the same MMEC for the CN node, e.g. the MME 112, 112A, 112B, 112AB, connecting to the shared eNB, e.g. the shared RNN 102, in for example GWCN.

The above method however may incur in a number of issues such as:

Lack of possible RRC rejections and only possibility to release and redirect the UE, due to completion of the RRCConnectionRequest procedure, and Problems with Paging procedure: indeed more than one UE may have the same S-TMSI and as explained previously this would imply that a Paging message to one of the UEs with such S-TMSI will trigger UE connection procedures for all the UEs sharing the same S-TMSI. The latter causes unnecessary signalling, waste of resources, need to over-dimension the network to be able to handle higher number of paging instances, UE access failures Therefore, the methods proposed above where it is proposed to either maintain one MMEC per sharing operator (or in general associate PLMN IDs to different MMECs supported in the CN, e.g. the CN 110) or the method of maintaining non-overlapping ranges of S-TMSI/Random Values to identify the selected PLMN ID of the UE, e.g. the wireless device 104, are not obvious as they incur respectively in the cost of:

Maintaining a higher number of MMECs and PLMN IDs to MMEC mapping, while a single MMEC could be maintained especially in GWCN cases.

Reducing the number of available S-TMSI/Random Values, which reduces the number of UEs that may potentially connect to the network.

Method Based on New Overload Actions

In some embodiments, which may apply for example to cases where it is known that the selected PLMN of the UE, e.g. the wireless device 104, connecting to a shared cell may not be deduced from the information sent in RRCConnnectionRequest, it is proposed to add one or more new values to the Overload Action IE contained in the S1: Overload Start message.

Such one or more new values may indicate the action of releasing with redirection, where the eNB, e.g. the shared RNN 102, once received from the UE, e.g. the wireless device 104, the selected PLMN ID and evaluated whether the UE, e.g. the wireless device 104, may be served or not, e.g. due to the overload situation, would be able to identify the most opportune cell and/or frequency and/or RAT towards which redirecting the UE, e.g. the wireless device 104.

In some implementation specific embodiments the shared RNN 102, e.g. eNB, may indicate a fictitious redirection target, namely a redirection target that is not available or that may not serve the UE, e.g. the wireless device 104. The latter would be justified by the fact that the UE, e.g. the wireless device 104, may not be admitted to the shared cell due to the situation of overload (which was verified by the eNB, e.g. the shared RNN 102, by comparing the selected PLMN ID with the PLMN IDs for which overload was declared) and because the UE, e.g. the wireless device 104, may not be rejected.

It should be noted that if no redirection targets are available, an RNN 102, e.g. eNB, may not redirect the wireless device 104, e.g. UE. However, in some implementation specific embodiments, the RNN 102 may "create" a redirection target such as an unused frequency, or a Cell ID that is not in range etc. The wireless device 104 may therefore be redirected to such "inexistent" redirection target and possibly find a better target RAT, after redirection, that is not overloaded.

The advantage of such solution is that in cases where the wireless device 104 may not be rejected due to lack of information concerning the serving PLMN ID of the wireless device 104, the only option to "get rid" of the wireless device 104 while still keeping the wireless device 104 on an active search for a better target cell is to release and redirect.

Note that although terminology from 3GPP LTE has been used in this as an example, this should not be seen as limiting embodiments herein to only the aforementioned system. Other wireless systems, including WCDMA, WIMAX, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Similarly, when talking about signalling over an S1 backhaul, the solutions are not limited to communication between eNB and MME but the communicating nodes can be any node terminating the backhaul interface over which the information described is transmitted.

It should be understood that even if wireless transmissions in the downlink are described in this disclosure, embodiments herein are equally applicable in the uplink.

When the word "comprise" or "comprising" is used in this disclosure it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a shared Radio Network Node (RNN) for managing overload in at least one core network, wherein the shared RNN is configured to serve a wireless device, wherein the wireless device and the shared RNN are configured to operate in a wireless communications network connected to the at least one core network, and wherein the method comprises:
receiving a connection request from the wireless device, wherein the connection request comprises a code that maps to:
one of a plurality of PLMN IDs served by the shared RNN, and
one of a plurality of logical partitions of a core network node connected to the shared RNN; and
when the logical partition of the core network node to which the code maps is associated with an overload action:
transmitting a rejection message in response to the connection request, or
indicating a redirection target in response to the connection request.

2. The method of claim 1, wherein the code is comprised in a System Architecture Evolution (SAE)-Temporary Mobile Subscriber identity (S-TMSI) that provides an identification of the core network node.

3. The method of claim 1, wherein the code is comprised in a random value that provides an identification of the core network node.

4. The method of claim 1, wherein transmitting the rejection message in response to the connection request further comprises:
transmitting the rejection message based on one or more parameters signaled by the wireless device in the connection request.

5. The method of claim 1, further comprising: releasing the wireless device in dependence of an indication of overload.

6. The method of claim 1, wherein indicating the redirection target in response to the connection request further comprises:
indicating the redirection target based on one or more parameters signaled by the wireless device during connection setup completion.

7. The method of claim 1, wherein the code maps to a sharing operator that shares the shared RNN.

8. A shared Radio Network Node (RNN) for managing overload in at least one core network, wherein the shared RNN is configured to serve a wireless device, wherein the wireless device and the shared RNN are configured to operate in a wireless communications network connected to the at least one core network, and wherein the shared RNN comprises a processor and a memory, which memory contains instructions executable by the processor, whereby the shared RNN is operative to:
receive a connection request from the wireless device, wherein the connection request comprises a code that maps to:

one of a plurality of PLMN IDs served by the shared RNN, and one of a plurality of logical partitions of a core network node connected to the shared RNN; and when the logical partition of the core network node to which the code maps is associated with an overload action:

transmitting a rejection message in response to the connection request, or indicating a redirection target in response to the connection request.

9. The shared RNN of claim 8, wherein the code is comprised in a System Architecture Evolution (SAE)-Temporary Mobile Subscriber identity (S-TMSI) that provides an identification of the core network node.

10. The shared RNN of claim 8, wherein the code is comprised in a random value that provides an identification of the core network node.

11. The shared RNN of claim 8, wherein the shared RNN is operative to transmit the rejection message in response to the connection request by further being operative to:

transmit the rejection message based on one or more parameters signaled by the wireless device in the connection request.

12. The shared RNN of claim 8, wherein the shared RNN further is operative to:

release the wireless device in dependence of an indication of overload.

13. The shared RNN of claim 8, wherein the shared RNN is operative to indicate the redirection target in response to the connection request by further being operative to:

indicate the redirection target in response to the connection request based on one or more parameters signaled by the wireless device during connection setup completion.

14. The shared RNN of claim 13, wherein the shared RNN is operative to indicate the redirection target in response to the connection request by further being operative to:

indicate, to the wireless device, a fictitious redirecting target that is not available or that cannot serve the wireless device.

15. The shared RNN of claim 14, wherein the fictitious redirecting target comprises an unused frequency and/or an identity of an RNN not in range and/or an identity of a cell not in use or not in range.

16. The shared RNN of claim 8, wherein the shared RNN is operative to indicate the redirection target in response to the connection request by further being operative to:

indicate a different core network node that has not indicated overload as the redirection target.

17. A method performed by a wireless device for assisting a shared Radio Network Node (RNN) in managing overload in at least one core network, wherein the wireless device is configured to be served by the shared RNN, wherein the wireless device and the shared RNN are configured to operate in a wireless communications network connected to the at least one core network, and wherein the method comprises:

transmitting a connection request to the shared RNN, wherein the connection request comprises a code that maps to:

one of a plurality of PLMN IDs served by the shared RNN, and one of a plurality of logical partitions of a core network node connected to the shared RNN; and when the logical partition of the core network node to which the code maps is associated with an overload action:

receiving a rejection message from the shared RNN, or receiving an indication of a redirection target from the shared RNN, whereby the wireless device assists the shared RNN in managing overload in the at least one core network.

18. The method of claim 17, wherein the code is comprised in a System Architecture Evolution (SAE)-Temporary Mobile Subscriber Identity (S-TMSI) that provides an identification of the core network node.

19. The method of claim 17, wherein the code is comprised in a random value that provides an identification of the core network node.

20. A wireless device for assisting a shared Radio Network Node (RNN) in managing overload in at least one core network, wherein the wireless device is configured to be served by the shared RNN, wherein the wireless device and the shared RNN are configured to operate in a wireless communications network connected to the at least one core network, and wherein the wireless device comprises a processor and a memory, which memory contains instructions executable by the processor, whereby the wireless device is operative to:

transmit a connection request to the shared RNN, wherein the connection request comprises a code that maps to:

one of a plurality of PLMN IDs served by the shared RNN, and one of a plurality of logical partitions of a core network node connected to the shared RNN when the logical partition of the core network node to which the code maps is associated with an overload action:

receive a rejection message from the shared RNN, or receive an indication of a redirection target from the shared RNN, whereby the wireless device assists the shared RNN in managing overload in the at least one core network.

21. The wireless device of claim 20, wherein the code is comprised in a System Architecture Evolution (SAE)-Temporary Mobile Subscriber Identity (S-TMSI) that provides an identification of the core network node.

22. The wireless device of claim 20, wherein the code is comprised in a random value that provides an identification of the core network node.

23. The wireless device of claim 20, wherein the wireless device is further operative to:

receive, from the shared RNN, a fictitious redirecting target that is not available or that cannot serve the wireless device.

24. The wireless device of claim 23, wherein the fictitious redirecting target comprises an unused frequency and/or an identity of an RNN not in range and/or an identity of a cell not in use or not in range.

* * * * *